(12) United States Patent
Jenkins et al.

(10) Patent No.: US 6,351,388 B1
(45) Date of Patent: Feb. 26, 2002

(54) MOBILE COMPUTER WITH PC HOUSING FOR PC CARD AND DONGLE

(75) Inventors: Michael D. Jenkins, Burke; John W. Williams, Gainesville, both of VA (US); Peter A. Ronzan, Los Gatos, CA (US); Peter S. Hong, Centreville, VA (US)

(73) Assignee: Xybernaut Corporation, Fairfax, VA (US)

( * ) Notice: Subject to any disclaimer, the term of this patent is extended or adjusted under 35 U.S.C. 154(b) by 0 days.

(21) Appl. No.: 09/455,642

(22) Filed: Dec. 7, 1999

Related U.S. Application Data (63) Continuation of application No. 08/975,964, filed on Nov. 21, 1997.

(51) Int. Cl.$^7$ .............................. G06F 1/16; H05K 7/02
(52) U.S. Cl. ........................................ 361/730; 361/686
(58) Field of Search .................................. 361/683, 730, 361/684, 685, 686; 345/168, 169; 312/208.4

(56) References Cited

U.S. PATENT DOCUMENTS

| | | | | |
|---|---|---|---|---|
| 5,285,398 A | * | 2/1994 | Janik | 364/708.1 |
| 5,305,181 A | * | 4/1994 | Schultz | 361/680 |
| 5,408,250 A | * | 4/1995 | Bier | 345/169 |
| 5,416,310 A | * | 5/1995 | Little | 235/462 |
| 5,416,730 A | * | 5/1995 | Lookofsky | 364/708.1 |
| 5,432,510 A | * | 7/1995 | Matthews | 341/20 |
| 5,514,861 A | * | 5/1996 | Swartz et al. | 235/472 |
| 5,579,487 A | * | 11/1996 | Meyerson et al. | 395/280 |
| 5,606,732 A | * | 2/1997 | Vignone, Sr. | 455/269 |
| 5,666,530 A | * | 9/1997 | Clark et al. | 395/617 |
| 5,761,485 A | * | 6/1998 | Munyan | 395/500 |
| 5,812,371 A | * | 9/1998 | Chen et al. | 361/686 |
| 5,844,824 A | * | 12/1998 | Newman et al. | 364/708.1 |
| 5,845,282 A | * | 12/1998 | Alley et al. | 707/10 |
| 5,848,298 A | * | 12/1998 | Steere, Jr. et al. | 395/882 |
| 5,909,586 A | * | 6/1999 | Anderson | 395/750.08 |
| 6,099,329 A | * | 8/2000 | Goff et al. | 439/131 |
| 6,149,450 A | * | 11/2000 | Gastineau | 439/325 |

* cited by examiner

Primary Examiner—Lynn D. Feild (57) ABSTRACT

This invention provides a computer structure where any PC card used with the computer will be inserted and used in a housing where the entire PC card is enclosed and protected. This prevents the frequent damage of PC cards in conventional computer structures.

8 Claims, 7 Drawing Sheets

MOBILE COMPUTER WITH PC HOUSING FOR PC CARD AND DONGLE

This application is a Continuation of Ser. No. 08/975,964 entitled "Mobile Computer" filed Nov. 21, 1997 in the U.S. Patent and Trademark Office.

This invention relates to a computer and, more specifically, to a computer having a novel PCMCIA housing and other novel features.

BACKGROUND OF THE INVENTION

Most, if not all, of the computers used today have means to use PCMCIA cards and thereby also have PCMCIA card connection means. The PCMCIA card (PC card) is generally connected to the computer housing at one terminal end portion of the housing whereby a portion of the PC card structure or attachment extends beyond said terminal end portion.

Figure 4:
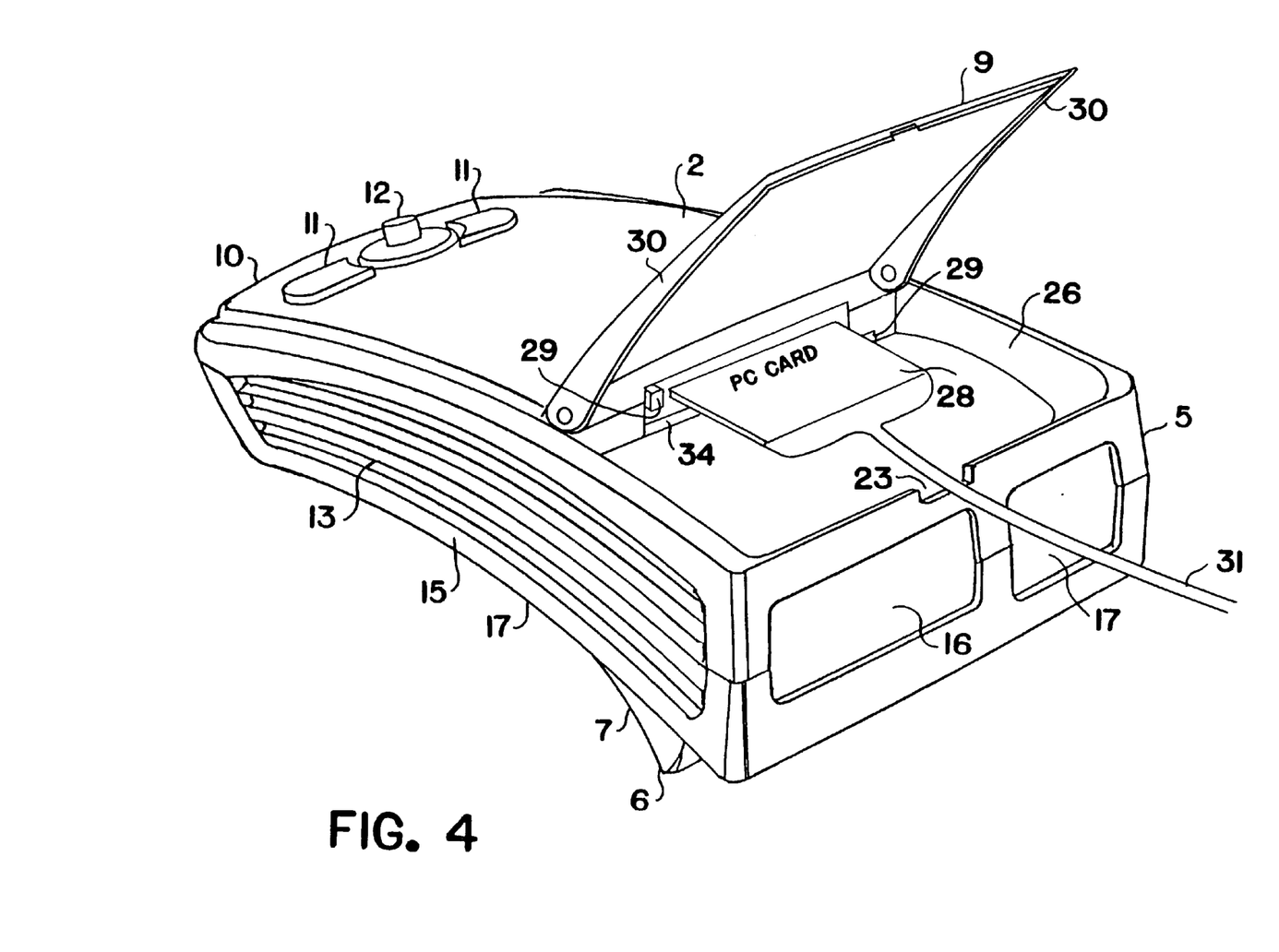
FIG. 4 is a left top perspective view of the convertible body-worn or body-supported computer of this invention illustrating the PC card compartment when the access door is opened.

PCMCIA or PC cards are traditionally made up of two parts. The first part is the PC card itself. It usually contains all the electronics necessary for performing a given function, e.g. modem communications. The second part (sometimes called a dongle or cable), is the connector and sometimes wire that attaches to the PC card on one end hereinafter referred to as the "second part" and on the other end of the wire is a second connector that attaches to a device such as standard telephone wiring. The combination structure of both this first part and second part will hereinafter be referred to as the "complete" or "entire" PC card. "Entire" or "complete" include the cable or wire attached to the PCMCIA card (as shown in FIG. 4, element 31).

One of the many problems that PCMCIA users encounter is the susceptibility of the dongle/cable (that is, the point where the dongle/cable is physically connected to the PC card) breaking during normal use. Most computer manufacturers build the PC card housing such that the PC card itself, when inserted into the computer, is embedded within the structure of the computer and is therefore protected. However, the most susceptible part for breaking is where the connector and cable attaches to the PC card. This connector and cable is not protected at all but extends out beyond the computer housing.

Another problem that is inherent with PCMCIA is that it is difficult to protect PC card slots from environmental factors (such as rain and dust) while a PC card is inserted into the computer housing.

The present invention eliminates the problems above by providing the PC card housing with the ability to not only seal off the connector but also allows the connector and portion of the cable connected to the PC card to also be contained within the housing.

There are known computers that have been used and disclosed involving wearable computers and computer components. The feature of these prior art computers is that they permit the user to have freedom to use his or her hands for repairing or other functions while using a fully functional computer. One of the most commercially successful and well known of these computers is the Mobile Assistant® available from Xybernaut Corporation of Fairfax, Va. Mobile Assistant® is a registered trademark of Xybernaut Corporation (formerly Computer Products & Services, Inc.)

U.S. Pat. No. 5,305,244 (Newman, et al.) describes the details of the Mobile Assistant® and fully discloses the components and function of such user-supported computers. Also, co-pending patent application Ser. No. 08/538,194 describes and claims further improvements and modifications to the Mobile Assistant®. Both U.S. Pat. No. 5,305,244 and Ser. No. 08/538,194 are owned by the assignee of the present application.

Also disclosing wearable computers are U.S. Pat. No. 5,285,398 (Janik I) and U.S. Pat. No. 5,491,651 (Janik II). Both of these patents disclose a belt computer containing the elements or components of a computer. In Janik I, the plurality of computing elements are located on the belt and a flexible signal relaying means connects all of the elements for computing. A protective covering is used for enclosing said computer elements. In Janik II, a similar belt computer is described and claimed in which the signal relaying means, the length of which between any two computing elements, is greater than the length of the wearable member between any two computing elements. In both Janik I and Janik II, the flexible wearable computer is in the form of a belt comprising around its periphery sequentially positioned computer elements.

In both Newman, et al. and Janik I and II, a body-worn computer is disclosed that has utility only as a body-worn mobile computer.

Also in the prior art, PC cards extend out from the main frame of the computer housing and are often damaged. This is quite frequently the case in mobile, body-worn or body-supported computers where movement of the user is frequent and sometimes extreme.

SUMMARY OF THE INVENTION

It is therefore an object of this invention to provide a computer structure devoid of the above-noted disadvantages.

Another object of this invention is to provide a computer structure having a housing containing a PC card weather proof compartment that houses substantially the entire PCMCIA (PC card) when in use.

Yet a further object of this invention is to provide a compartment for a removable hard drive in a reversible mobile computer.

Still a further object of this invention is to provide a mobile computer that has means for communicating with other means using infrared technology.

Another object of this invention is to provide a computer structure that can be used as both a mobile computer and a stand alone or desktop computer.

Another still further object of this invention is to provide a mobile computer having outlets or other means to connect onto or be compatible with components of a stand alone, laptop or desktop computer.

Yet another object of this invention is to provide a computer structure that contains substantially all of the components needed in a general purpose or conventional computer including but not limited to input/output means, processor means and storage means.

Other objects will become apparent upon a further reading of this disclosure.

The above objects and others are accomplished, generally speaking, by providing a mobile, body-worn or body-supported computer comprising a computer housing, activating means, means for attaching said computer housing to a user, said computer housing comprising substantially all of the components of a conventional computer with optionally a monitor, said housing comprising a PC card housing having means to contain substantially an entire PC card when contained therein. Optionally the computer of this invention also could comprise:

A. a compartment for housing a removable hard drive; and
B. an opening for internal connection to an IrDA transceiver.

This computer structure is usable as both a mobile body-worn or body-supported computer and as a component for a stand alone, laptop or desktop computer or any other conventional computer. By "conventional computer" is meant any computer known and used today such as those available from IBM, Dell, Apple, Compaq, Toshiba, Micron, Hewlett-Packard, etc. The computer structure of this invention in one body-worn or body-supported embodiment has a computer housing that can be worn around the torso or waist of a user and is curved on its inner side (the side that contacts the user's waist) to be contoured in accordance with the curvature of the user's waist. It has structural dimensions or area that occupies only a portion of said user's waistline. Thus, unlike Janik I and II above discussed, does not encircle the entire waist of the user. When used as a waist-worn computer, it is important that cables and other electrical connections extend from the back portion of the computer so as to be out of the way and not interfere with the user's hands when he or she is attempting to repair an object or machine or otherwise use their hands. The computer structure is symmetrical; therefore, the computer can be turned upside down as a unit for left-hand operation. The cable outlets in this manner always will face the back of the user. Conversely, the mouse controls (when converted to a conventional desktop or stand alone computer) will always be positioned in the front of the computer housing convenient for the right or left-hand user. The computer of this invention as earlier noted can be a body-supported computer, can be a laptop computer, can be a stand alone or desktop or any other type computer. It can optionally contain a monitor in the same or different structure than the main computer housing. The housing of the computer of this invention has outlets for connection to other components such as power supplies, monitors, keyboards or any other required component. All embodiments of a mobile computer described in co-pending application Ser. No. 08/538,194 and U.S. Pat. No. 5,305,244 are included in those structures usable in the present invention with the modification described and claimed herein. The disclosure of Ser. No. 08/538,194 is incorporated by reference into the present disclosure.

The embodiment of this invention that includes voice or audio activation when the computer is body-worn or body-supported also includes a body-worn or body-supported display screen such as a head-worn or arm-worn display. Other activation means than audio may be used in the computer of this invention such as eye-tracking activation means, electroencephalography, head or arm tracking means, or keyboard, pen, mouse, touch activation means and mixtures thereof. Some activation means and other peripherals are noted in co-pending application Ser. No. 08/861,598; these are all incorporated by reference in the present disclosure. The computer housing in the present invention includes all of the components found in a conventional computer such as a storage means, processor means, audio transducer and converter means and recognizing means, all of which are described in detail in U.S. Pat. No. 5,305,244. Also included in this embodiment are means for mounting the computer housing onto a user. Generally, attachment is made on a belt worn by a user such as around the waist, over the shoulder or onto a vest or other wearable means. The sides of the computer housing are ribbed or louvered to permit heat to be dissipated from the interior of the housing and to allow proper internal temperature best suited for computer operation. The computer housing generally is made of a lightweight yet rigid plastic or other suitable material. It is contoured or curved to follow the curvature of the human body such as the waistline. The portion of the computer housing that contacts the user's body has a movable stand that doubles as a belt loop (when used as a body-worn or body-supported computer) and a lift stand when used as a conventional computer. The electrical cord conduit connections found in the back portion of the housing are also contoured to parallel the curvature of the waist. Once placed on a flat supporting surface for use as a conventional computer, the conduits would point downwardly at an angle which would make it difficult to connect cables for monitor, power or keyboard connection. To correct for this, a movable lift stand is located on the rear underside of the computer housing. When this lift stand is moved down, it lifts the rear or back portion of the computer housing so that the conduits are on a plane substantially parallel with the supporting surface and are pointed straight out. This allows easy insertion of cables and electrical connectors into the conduits. The front underside of the housing will, in the preferred embodiment, also have a loop through which a belt will fit when attaching to a user. The conduits which are preferably located in the rear side of the housing are used for cable connection to the body or head-mounted display or conventional monitor. Another aperture is used for connection to a power supply and a third aperture may be used for connection to a keyboard when used as a stand alone, laptop or desktop computer.

When the structure of this invention is used as a conventional computer, there are located on the top section of the housing three movable levers, joy sticks or buttons or other means, one to operate a mouse and the other two for program execution or cursor manipulation. When the mobile function is desired, the top, movable button or lever will always be used in the same manner whether worn on the right or left-hand side of the user.

DESCRIPTION OF THE DRAWING AND PREFERRED EMBODIMENTS

Figure 1:
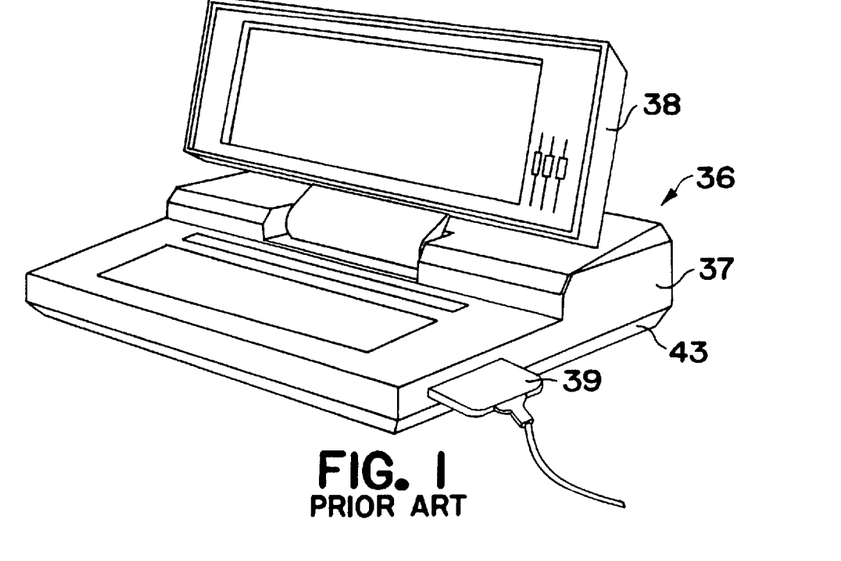
FIG. 1 is a side perspective view of a prior art laptop computer illustrating a PC card connection means.

In FIG. 1 a laptop computer 36 as well known in the prior art is illustrated. The laptop 36 has the conventional components of a computer including a computer laptop housing 37 and a monitor 38. The PCMCIA (PC card) card 39 is shown as conventionally used and attached in a laptop 36. It can be seen in FIG. 1 that PC card 39 is extending to a large degree outside of the housing 37 which exposes it to damage if contacted by any substantial force. Also in FIG. 2 a prior art mobile computer 40 is shown with PC card slot openings 41 which are adapted to receive PC cards 42. In both prior art devices shown in FIGS. 1 and 2, the PC cards 39 and 42 when in use extend substantially beyond the side terminal portions 43 and 44 of the laptop 36 and mobile computers 40, respectively. In these prior art devices, the PC cards can be easily broken or damaged especially in movable computers thus rendering the computer capability provided by the PCMCIA (PC) card non-functional.

Figure 2:
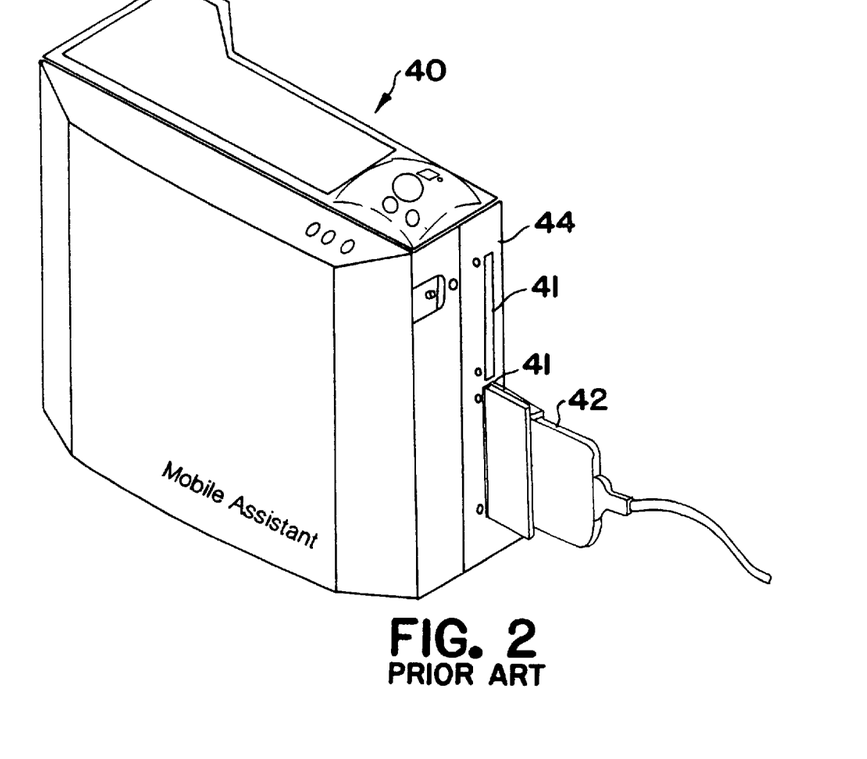
FIG. 2 is a side perspective view of a prior art body-worn or body-supported computer illustrating a PC card connection means used therein.
Figure 3:
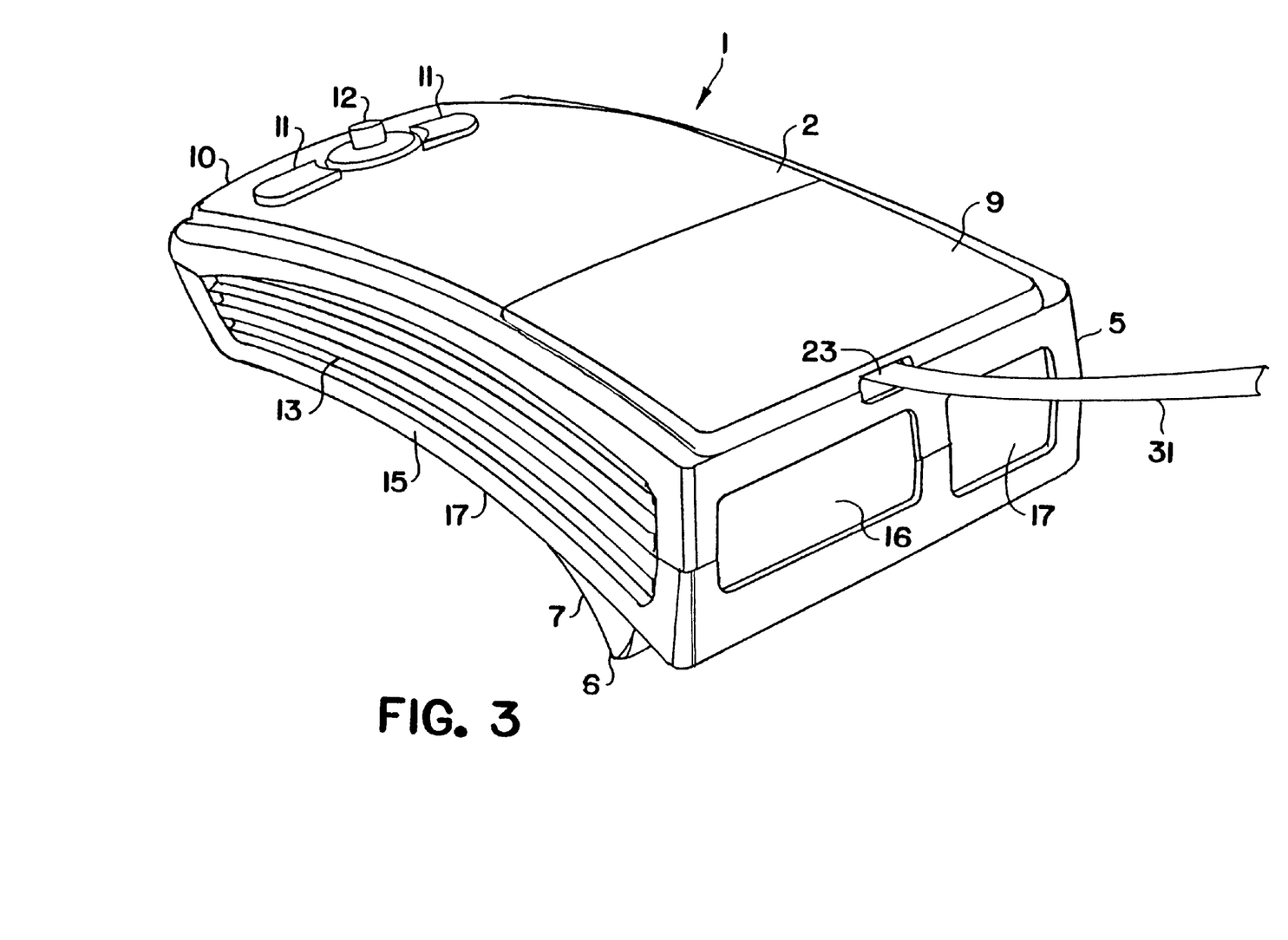
FIG. 3 is a left top perspective view of the convertible body-worn or body-supported computer of this invention with the PC card connector cable extending from the PC card compartment.
Figure 5:
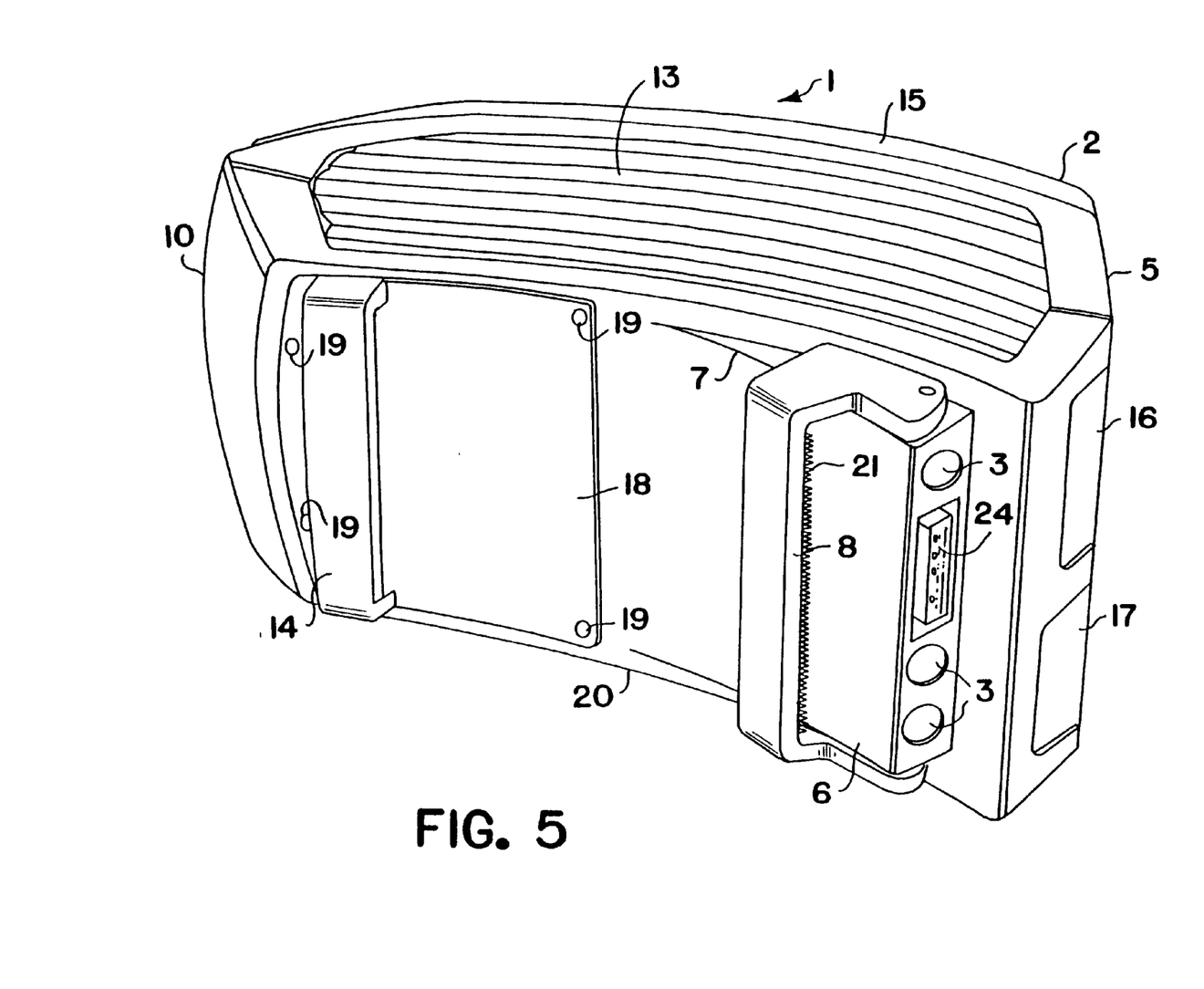
FIG. 5 is a bottom perspective view of the convertible body-worn or body-supported computer illustrating the hard drive access compartment closure.
Figure 6:
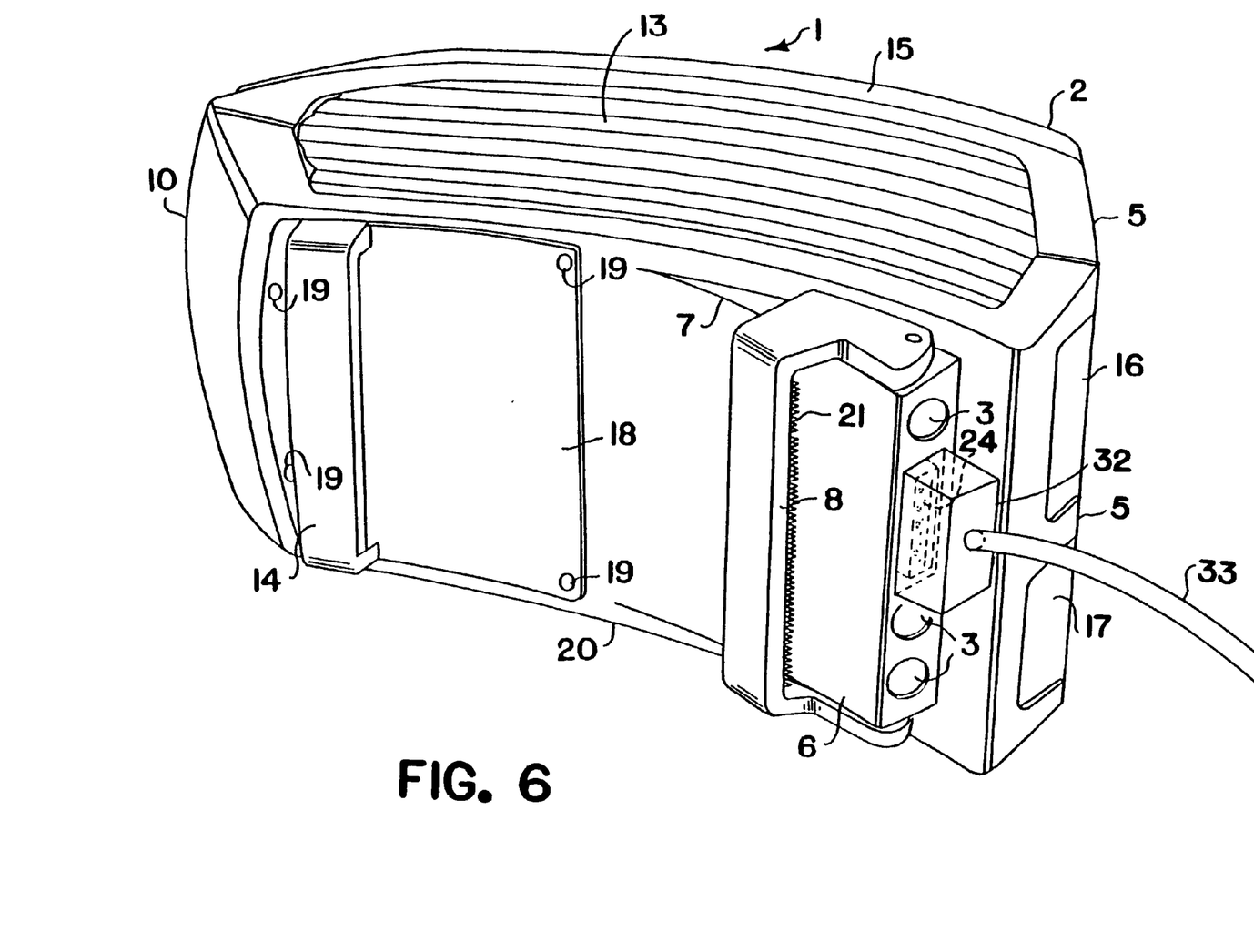
FIG. 6 is a right bottom perspective view of the convertible body-worn or body-supported computer illustrating the connector5 for peripherals and the recessed location of the computer connector means.
Figure 7:
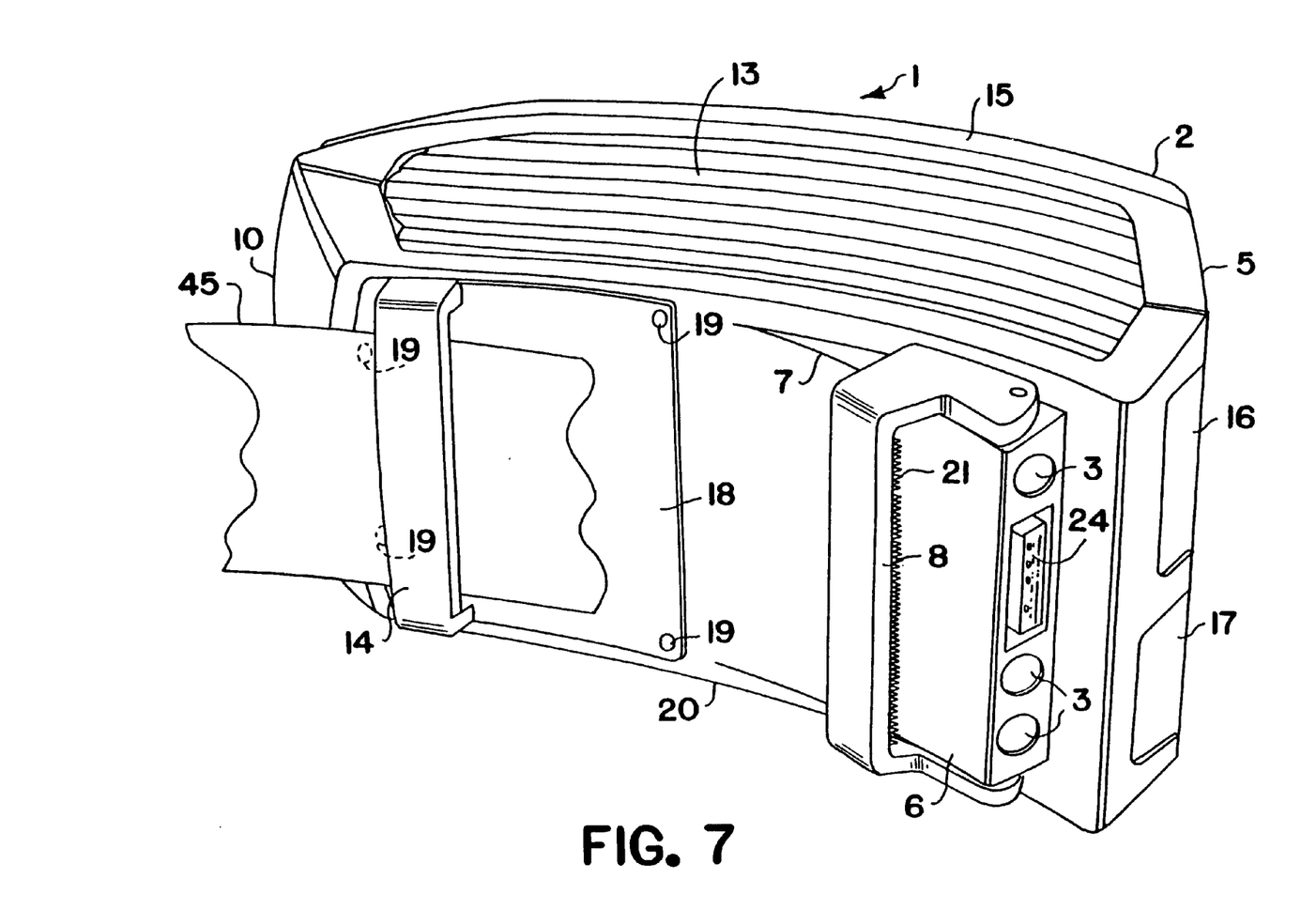
FIG. 7 is a right bottom perspective view of the convertible body-worn or body-supported computer illustrating the recessed connector means without the connection thereto of the connector.

In FIG. 3 the mobile body-worn or body-supported computer 1 of this invention is shown. In this figure, a lift door 9 is shown which opens into a PC card compartment 26 (as seen in FIG. 4). When the PC card 28 is housed in compartment 26 and door 9 is closed, the cable 31 connecting from the housed PC card 28 is extended through slot 23. In one embodiment of this invention the door 9 when open exposes a connection 34 for at least one PCMCIA card(s) (PC cards) 28 (one to four cards). This is an improvement of importance since extending PCMCIA cards (PC cards) shown in FIGS. 1 and 2 can easily be broken or damaged thus rendering the computer capability provided by the PCMCIA card non-functional. The PC cards are housed totally within the housing 26 (as seen in FIG. 4), only the cable or connector 27 extends out from the housing 26 and door 9 through slot 23. Also, the housing 26 permits sealing 30 around the door to make it weatherproof when worn outdoors. This internal housing 26 now provides means to prevent damaging the PC card 28 and means to weatherproof the card 28 and housing 26 from rain, water, snow or other inclement conditions. Ejecting means on buttons 29 are now easier to get to than the prior art buttons which are recessed and are hard to access. In addition, the pressure points on the PC card 28 are reduced in the present embodiment to further minimize damage to the card 28. Resilient waterproofing seal 30 is used to weatherproof the door and, as noted, protect the interior on housing 26 and card 28 from damage resulting from weather conditions. In FIG. 3 cable 31 which is connected to card 28 within housing 26 is shown after door 9 is closed to hermetically seal in card 28. In FIG. 3 on the top front portion 10 of the computer housing 2 are central buttons 11 and joy stick or lever 12. The lever 12 is used to move and control a mouse pointer when the computer 1 is used as a mobile or conventional computer. The control buttons 11 are used for program execution or menu selection when the computer 1 is used as a conventional computer. These controls 11 and 12 are clearly illustrated in FIGS. 3 and 4. On the sides of the computer 1 are located vent louvers (or a heat sink) 13 which allow the heat from inside the computer housing 2 to be dissipated or vented out to the atmosphere. These ribbed side vents or louvers 13 help reduce the inside heat which heat could cause malfunctioning or slowing down of the computer functions. The computer housing 2 is symmetrical so that when it is worn on either the right-hand side or left-hand side of the user's waist, the back section 5, peripheral connector means 3 and cables 4 will always face the back of the user. When the computer 1 is used or converted into a conventional computer and placed on a flat desk or other surface, a stationary stand 14 is used to support the front section 10 of the computer. This front stand 14 is also used as a belt loop (or handle) as shown in FIGS. 5, 6 and 7. In FIG. 5, lift stand 8 is moved down to permit easy connection of cables 4 to outlets 3. It can be seen that without lift stand 8, connection of cables would be very difficult because of the extreme angle of outlet conduits 3. When computer 1 is used or converted to a conventional computer, cables 4 connect to components of a conventional computer such as monitors, keyboards, power supplies or any other desirable component. The stand 8 when down permits easy access to conduits 3 and allows the computer 1 to be used on a flat surface as is customary when using a conventional or laptop computer. The louvered sides or vents 13 allow heat dissipation in this mode of use.

Figure 8:
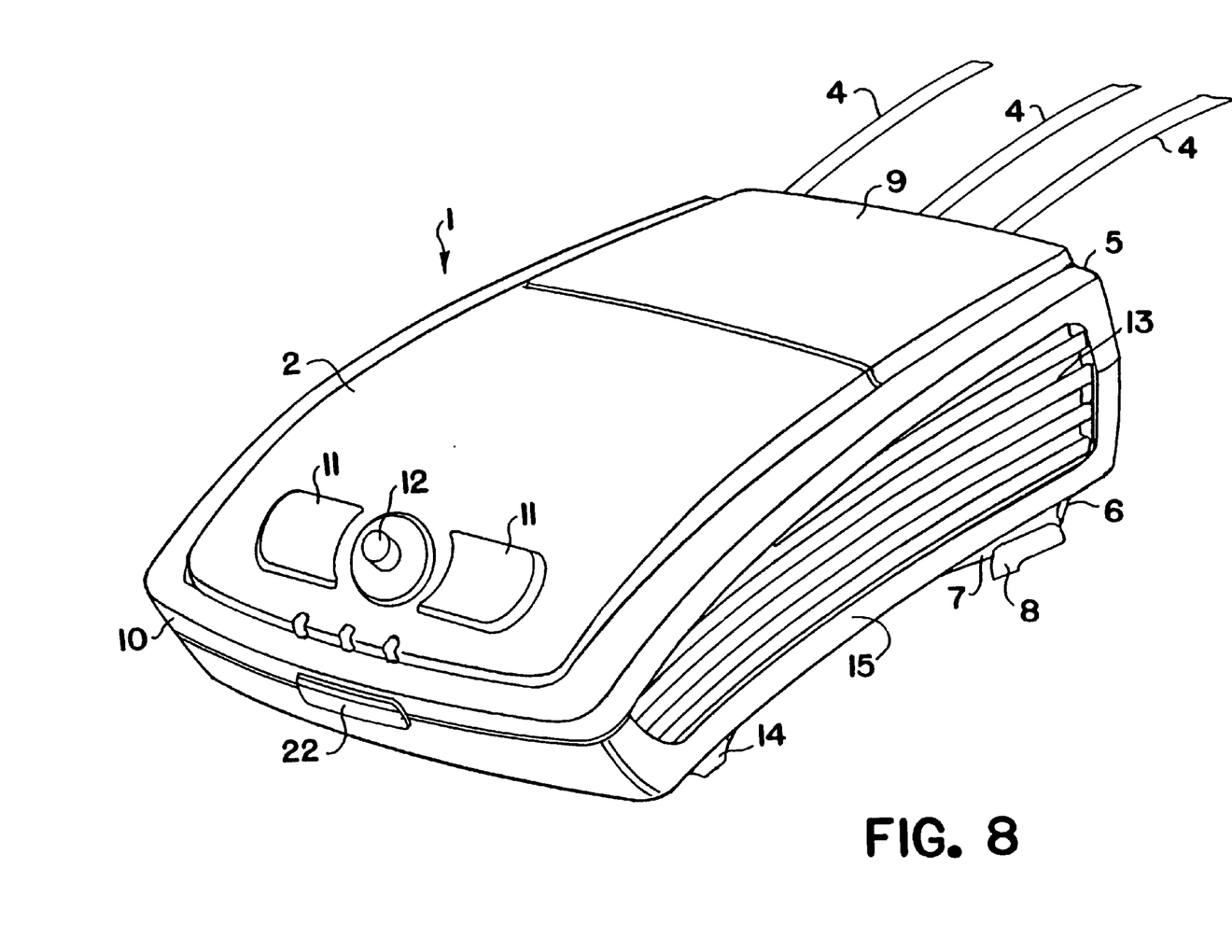
FIG. 8 is a top front perspective view of the body-worn or body-supported computer illustrating the IrDA port.

In FIGS. 3, 4 and 8, top front 10 of the computer is illustrated wherein control buttons 11 are easily accessible to both right and left-handed users. When the computer housing 2 is turned upside down in changing from right-hand to left-hand use, the controls of buttons 11 and mouse lever 12 always face the front of the user for easy access and use. Conversely, when right side 15 is facing up or down when worn, the controls 11 and 12 always face the front cables 4 and outlets 3 always face the back of the user. Controls or software can be provided to convert or reverse the functions of controls or buttons 11. Versa Point® mouse pointing technology may be used as one suitable means in controls 11 and 12. Versa Point® is a trademark of Interlink Electronics of 547 Flynn Rd., Carnarillo, Calif. 93012. Opening 22 is IrDA port that can be used for wireless communications. IrDA (Infra Red Data Association) ports are know, for example, as disclosed in U.S. Pat. No. 5,491,651 and other publications. IrDA are used as transceivers (transmit and receive) to communicate with local area networks, with printers, with another computer for transferring of information or data and other desired uses. In the present invention, opening of port 22 is used for access to an IrDA connection.

In FIG. 4, a top back view of the computer 1 is shown without the lift stand 8 and front stand 14 for clarity. The positioning of offset or recessed bottom extension 6 is shown slightly indented and below back portion 5 of the computer housing 2. The curvature 17 of housing 2 which is adjacent to the user's body is shown in FIG. 4. While FIG. 4 and the other figures all show (for clarity purposes only) a rectangular configuration for housing 2, other shapes or configurations may be used if desirable. For example, an oval or circular configuration may be used if the other specifics of this invention as claimed are present. Openings 16 and 17 provide means for connecting to computer 1 other peripheral equipment such as floppy drives, bar code scanners, VGA port or external monitor connectors. Housing 2 preferably is constructed of a lightweight, structurally strong plastic. Outlets 3, any suitable number of them, may be used and are positioned in bottom extension 6 but are not visible in FIG. 4. FIGS. 5–7 clearly show the location of these electrical outlets or conduits 3. Opening 23 is a cable opening for cables used with PCMCIA card slots.

In FIG. 5, the bottom of housing 2 is shown in a preferred embodiment having front stand-front loop 14 located in a position in front 10. An easy access door 18 is located in the bottom section and provides an access cover for insertion into the bottom of housing 2 of storage means or non-volatile storage means. Four screws (any number) 19 are easily removed to permit access therein. In FIG. 7, the bottom of the computer downwardly facing side 20 has positioned therein an access door 18 which covers a removable hard drive compartment. That is, a compartment for housing a removable hard drive. Access to this compartment is obtained by removing screws 19 which permits removal of door 18 and permits an enclosed compartment for a hard drive. In the prior mobile computer, the entire housing needs to be disassembled to have access to a hard drive compartment. A hard drive with a higher capacity than PC card 28 is desirable in many instances. The computer 1 of this invention provides this flexibility of using both PC cards 28 and hard drives of high capacity. Ease of removing screws 19 makes use of the optional hard drive compartment convenient for the user. Movable lift stand 8 is shown folded up (body-worn or body-supported mode) but is conveniently moved downward as shown in FIG. 2 (conventional computer mode) when desired. As shown in FIG. 5, lift stand 8 and front stand 14 act as loops or belt guides when computer 1 is worn around the waist or elsewhere on the user's body. Stands 8 and 14 are shown protruding in an exaggerated manner to show the structure and function; however, any comfortable arrangement may be used for the comfort and convenience of the user. Outlet 24 is used to connect a head-mounted display (HMD) or other display means to the computer 1 when it is used as a body-worn or body-supported computer. In FIG. 5, offset connectors 24 and 3 are shown curbed to conform to the body of the user (usually the waistline) and also are recessed or offset from the back portion 5 of the computer housing. This is important since the major portion of connector 32 is recessed and protected to prevent damage to the connector(s) 32 when worn. Not only is the recessed connector 24 desirable but also its curvature to conform to a wearer's waist is important for both comfort and durability. When body (or waist worn) rigid connectors are worn parallel with the user's waist they will be exposed to less possibility of damage and, as noted, are more comfortable. FIG. 6 shows connector 32 when attached to the outlet 24 where the outer portion of connector 32 which is connected to cable 33 does not extend much beyond the back portion 5 of the computer housing 2. Connectors 24 and 3 are used in this mobile computer 1 to connect to a headset or display means and to power sources and, when needed, to a keyboard. In all of the figures, the computer 1 is used with hands-free activation means as disclosed in U.S. Pat. No. 5,305,244 and co-pending application Ser. No. 08/839,500. The computer 1 may be used by right and left-handed users. This is accomplished since, as earlier mentioned, the computer housing is symmetrical. "Symmetrical" as used herein means symmetry of longitudinal sides 15 (top) and (bottom) 20, i.e. are alike in size, shape and position. Left side 20 in FIG. 7 is facing downward.

In FIGS. 6 and 7, the computer 1 is shown in a position when used as a mobile body-worn or body-supported computer around the waist of a user. A belt 45 encircles the waistline of the user with computer 1 occupying only a portion of the waistline unlike the computer of Janik I and II which encircles and occupies substantially the entire waistline. Also, all of the computer components necessary for a conventional computer are compactly located in one housing, i.e. housing 2 in the present invention. Notice that, as earlier stated, the cables 31 and 33 always face the back or rear of the user so that they are out of the way when the user is using his or her hands for the task at hand, i.e. repairing a machine, etc. When this disclosure uses the term "waist" or "waistline", it is understood to include other parts of the human body in which it would be desirable to wear this computer.

The preferred and optimumly preferred embodiments of the present invention have been described herein and shown in the accompanying drawings to illustrate the underlying principles of the invention but it is to be understood that numerous modifications and ramifications may be made without departing from the spirit and scope of this invention.

What is claimed is:

1. A computer structure comprising a computer housing and activation means, said computer housing comprising substantially all of the components of a conventional computer, said housing comprising a PC card housing having means for attachment therein to an external connection means for a PC card, said PC card housing having means to contain substantially an entire PC card and its dongle, leaving only a cable connected to said PC card exposed outside said PC card housing, and wherein said activating means is selected from the group consisting of audio activation means, eye-tracking activation means, electroencephalography, head or arm-tracking means, a keyboard, pen, mouse, touch activation means and mixtures of said activation means, said PC card housing having an opening through which a cable attached to said entire PC card can extend to outside said computer structure.

2. The computer structure of claim 1 wherein said computer housing has a section on its back portion for attachment thereto of computer peripheral means.

3. The computer structure of claim 1 wherein said housing has mouse control means on its front portion.

4. The computer structure of claim 1 having a connection to be used with equipment of a stand-alone computer including a power supply, a keyboard or monitor.

5. The computer structure of claim 1 comprising a computer body-supported housing, said activating means, means for supporting said computer housing on a user, said computer housing comprising substantially all of the components of a conventional computer with or without a monitor, said housing having a compartment with removable closure means for housing a removable hard drive or other non-volatile storage means, said compartment located in said housing at a location that will permit easy opening and closing of said removable closure means.

6. The computer structure of claim 1 comprising said computer housing, said activating means, means for attaching said computer housing to a user, said computer housing comprising substantially all of the components of a conventional computer with or without a monitor, said housing comprising on an outer portion thereof an opening for internal connection to an IrDA transceiver.

7. A hands-free portable body-supported computer system comprising a computer housing, hands-free activation means, and means for supporting said computer housing on a user, said computer housing comprising substantially all of the components of a conventional computer, said housing also comprising a PCMCIA card housing having means for attachment therein to an external connection means for said PCMCIA card, said PCMCIA card housing having means to contain or house substantially an entire PCMCIA card and its dongle but not a cable connected to said PCMCIA card, said activating means selected from the group consisting of audio activation means, eye-tracking activation means, electroencephalography, head or arm-tracking means, and mixtures of said activation means.

8. The computer structure of claim 7 comprising a computer housing, activating means, means for attaching said computer housing to a user, said computer housing comprising substantially all of the components of a conventional computer with or without a monitor, said housing comprising on an outer portion thereof an opening for internal connection to an IrDA transceiver.

\* \* \* \* \*